United States Patent [19]

Thompson

[11] 4,213,627
[45] Jul. 22, 1980

[54] TRAILER HITCH

[76] Inventor: Woodrow F. Thompson, 440 Pine Villa Dr., City of Atlantis, Lantana, Fla. 33462

[21] Appl. No.: 957,902

[22] Filed: Nov. 6, 1978

[51] Int. Cl.² ............................................. B62D 53/00
[52] U.S. Cl. .............................. 280/406 A; 280/446 B
[58] Field of Search ....................... 280/406 A, 446 B; 254/86 R, 86 H

[56] References Cited

U.S. PATENT DOCUMENTS

| | | | |
|---|---|---|---|
| 3,600,004 | 8/1971 | Newkirk | 280/446 B |
| 3,801,133 | 4/1974 | Thompson | 280/406 A |
| 3,900,212 | 8/1975 | Ewing | 280/406 A |

Primary Examiner—John P. Silverstrim
Assistant Examiner—Randall A. Schrecengost
Attorney, Agent, or Firm—Jenkins, Coffey, Hyland, Badger & Conard

[57] ABSTRACT

In an anti-sway type trailer hitch having rearwardly-extending load-levelling bars between a hitch connector element and the side rails of a trailer tongue, braking force is applied between the connector element and a pair of conjointly pivotally mounted housings having rearwardly-opening circular cross-section sockets. The sockets receive circular cross-section rearwardly tapering load-levelling bars. This configuration permits the bars to be rotated occasionally to prevent them from taking a set due to applied load. Load is applied to transfer the trailer's weight away from the hitch through a pair of brackets adjustably mounted on the trailer tongue side rails for movement along the side rails. Each bracket includes a support column slidably receiving a jacking bolt. The jacking bolts include, at their vertically lower ends, eyes or other apparatus for supporting the distal ends of the load-levelling bars. The vertically upper end of each jacking bolt is provided with a jacking head. A small, portable hydraulic jack is selectively positioned between each bracket and its respective jacking head to jack the jacking bolts upwardly and load the bars. When a desired load is achieved, a locking pin is inserted through a transverse passageway in the jacking bolt to maintain the bolt position.

6 Claims, 4 Drawing Figures

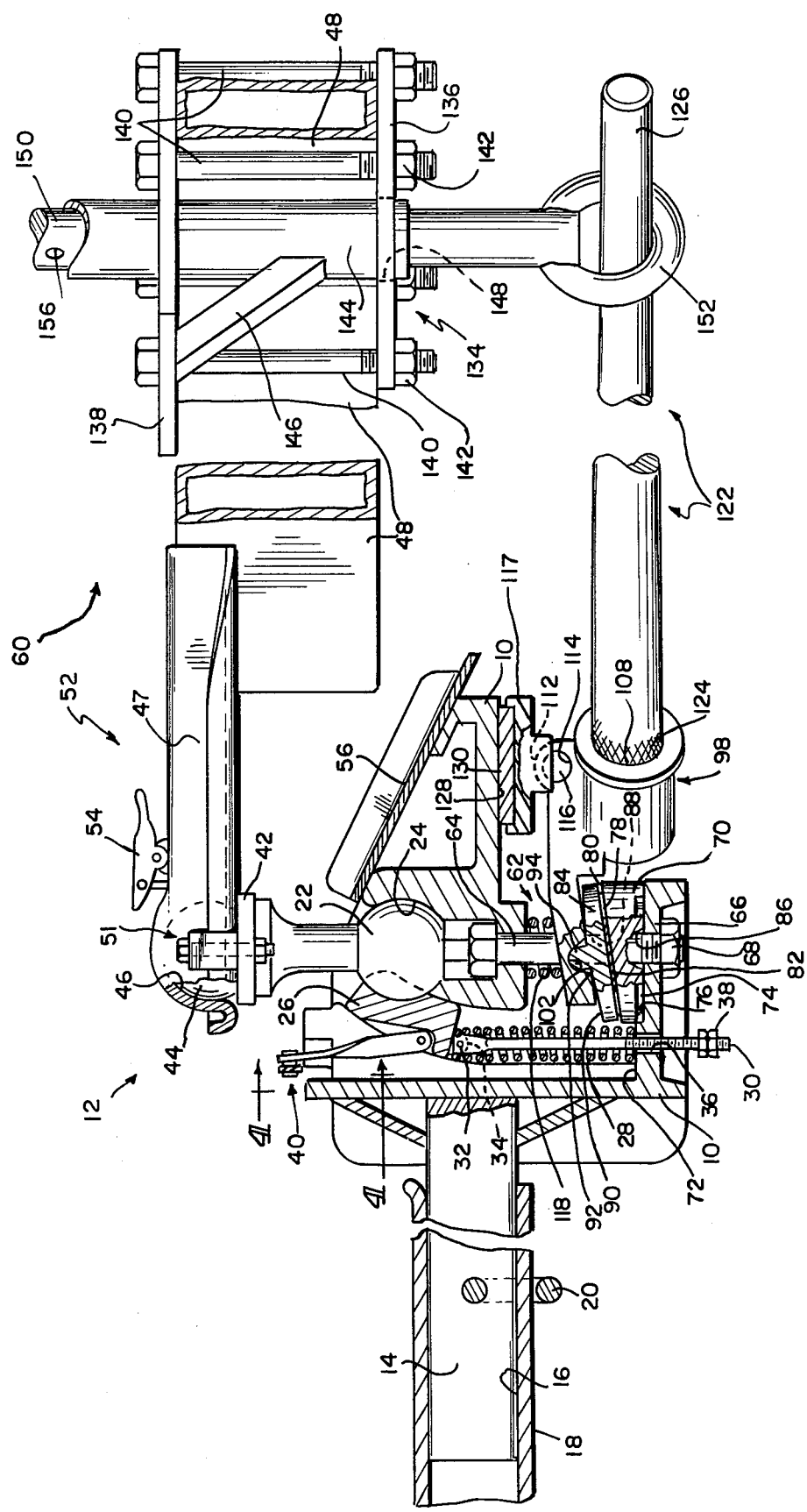

TRAILER HITCH

This invention relates to trailer hitches, and particularly to an anti-sway type hitch having improved characteristics.

Anti-sway type hitches are known. There are, for example, the hitches described in the following U.S. patents: Millikan U.S. Pat. No. 3,542,395; Worley U.S. Pat. No. 3,284,098; Laughlin U.S. Pat. No. 3,403,928; Bernard et al U.S. Pat. No. 3,129,957; Bolyard U.S. Pat. No. 3,347,562; Reese U.S. Pat. No. 3,194,584; Tunesi U.S. Pat. No. 3,814,463; Bernard U.S. Pat. No. 3,434,735; Mathisen U.S. Pat. No. 2,597,657; Bernard et al U.S. Pat. No. 2,898,124; Hendricks U.S. Pat. No. 3,552,771; and Newkirk U.S. Pat. No. 3,600,004. Other types of trailer hitches are illustrated in Rendessy U.S. Pat. No. 3,297,340; Everett et al U.S. Pat. No. 3,061,334; Curtis U.S. Pat. No. 2,940,776; Wettstein U.S. Pat. No. 2,772,893; Smith U.S. Pat. No. 2,605,115; Meyer U.S. Pat. No. 2,120,415; Claus U.S. Pat. No. 2,070,884; and Branstrator et al U.S. Pat. No. 2,700,554. Of special interest are the following U.S. patents issued to one of the co-inventors herein: U.S. Pat. Nos. 3,801,133; 3,588,145; and 3,879,061, all issued to Woodrow F. Thompson.

It is an object of the present invention to provide a trailer hitch which constitutes an improvement upon the hitch concepts described in the aforementioned Thompson patents.

According to the present invention, a trailer hitch includes a draw bar for securing to a towing vehicle, a connector secured to the draw bar, and a coupler for securing to the tongue of a trailer to be towed. The coupler is selectively engageable with the connector. The connector includes a vertical post, first and second cam discs concentrically disposed about the vertical post and having complementary bevelled engaging surfaces. One of the discs is nonrotatably secured to the connector and the other of the discs includes means for coupling a pair of housing members to it for conjoint rotation. The housing members are thereby pivotally mounted about the vertical post for swinging movement in a generally horizontal plane. Selectively movable supports are mounted on the trailer side rails. Each support includes a support column and a jacking bolt. The jacking bolt extends generally vertically through the column and is provided at its lower end with an eye and at its upper end with a jacking head. A pair of generally circular cross-section load-levelling bars are provided. Each bar includes a first, larger diameter end and a second, smaller diameter end joined by an intermediate tapered portion. The larger diameter end fits into a circular cross-section socket provided in its respective housing member. The smaller diameter end extends through the eye at the vertically lower end of its respective jacking bolt. The jacking force is exerted, such as by a portable hydraulic jack, between each support bracket and its respective jacking head to lift the second ends of the load-levelling bars vertically with respect to the supports. Lock means are provided to lock each jacking bolt in a selected vertical orientation with respect to its support column.

The hitch further comprises a first flat friction member non-rotatably mounted on the connector adjacent the post and a second flat friction member operatively connected to the housing members and disposed in engagement with the first friction member. The second flat friction member rotates about the post with the housing members and the load-levelling bars in such a manner that force is imparted through the load-levelling bars to press the friction members into engagement. A load-levelling and anti-sway connection is thereby established between the towing vehicle and the trailer.

The invention may best be understood by referring to the following description and accompanying drawings which illustrate the invention. In the drawings:

FIG. 2 is a vertical sectional side elevational view, taken generally along section lines 2—2 of FIG. 1;

Figure 1:
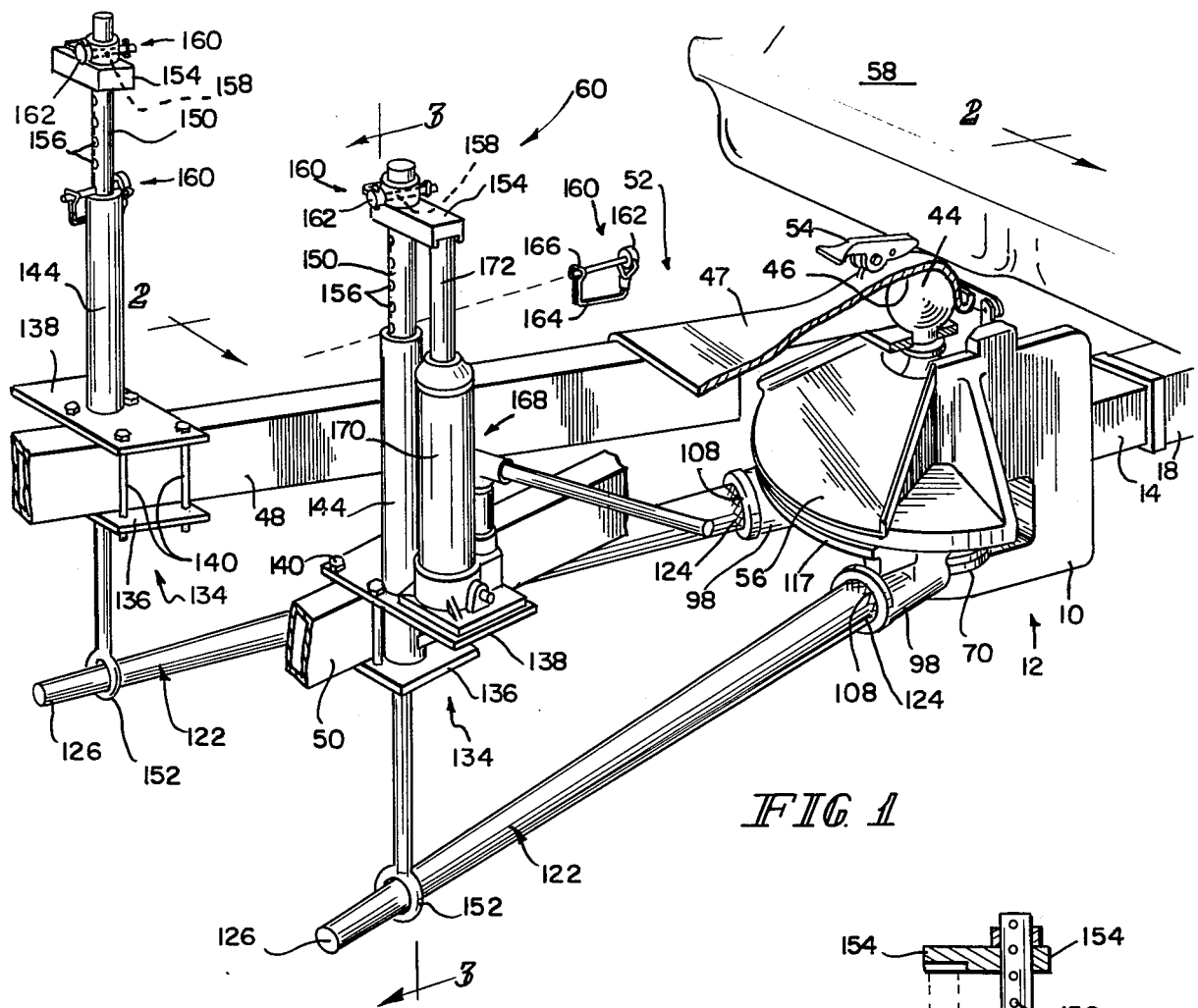
FIG. 1 is a fragmentary perspective view of the entire assembly including the rear end of a towing vehicle, the trailer hitch, and elements of the tongue of the towed vehicle, or trailer.
Figure 4:
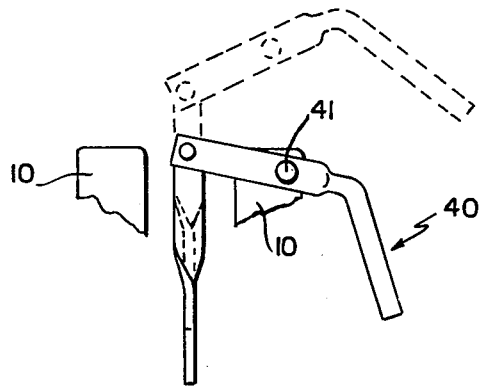
Figure 3:
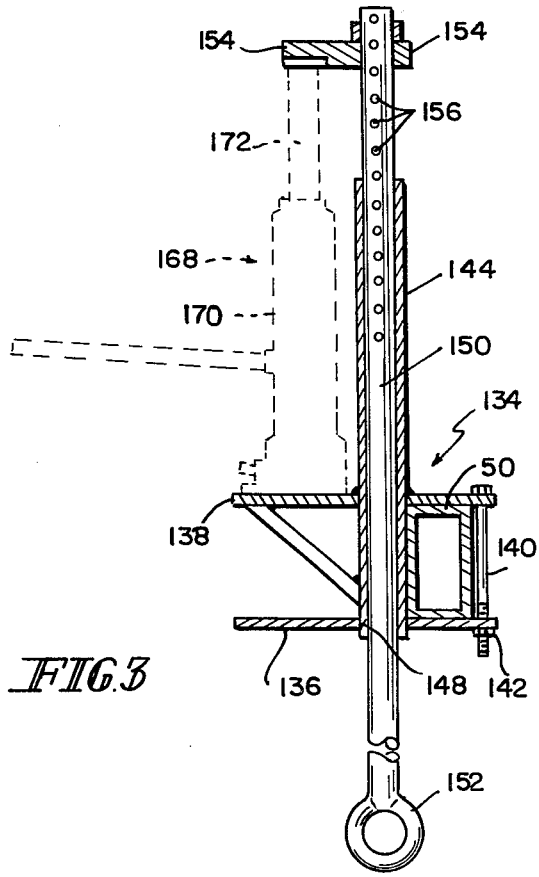

FIG. 3 is a fragmentary vertical sectional view taken generally along section lines 3—3 of FIG. 1; and FIG. 4 is a fragmentary sectional view taken generally along section lines 4—4 of FIG. 3 showing a detail of the assembly of FIGS. 1 and 2.

Turning now particularly to FIGS. 1 and 2, the connector body portion 10 of a trailer hitch 12 is provided with a forwardly-extending, generally rectangular cross-section connector bar 14 adapted to be received in a rectangular cross-section socket 16 (FIG. 2) of a draw bar 18. A locking bolt 20 retains connected bar 14 in socket 16.

A depending ball 22 is disposed in a complementary socket 24 in the connector body 10. Socket 24 is somewhat larger than necessary to receive ball 22 to accommodate a lock bolt 26. Lock bolt 26 retains ball 22 in socket 24. Lock bolt 26 is normally urged upward by a spring 28 surrounding a bolt 30. Bolt 30 is secured by a hinge pin 32 through cooperating hinge knuckles 34 on the bolt 26 and bolt 30. Bolt 30 is loosely retained within a passage 36 in connector 10 by a nut 38. An articulated operating lever 40 (see FIG. 4) is pivotally connected to the lock bolt 26 and selectively engageable with a pin 41 on the body portion 10 to move between positions permitting disengagement of ball 22 from socket 24 (broken lines in FIG. 4) and preventing disengagement of ball 22 from socket 24 (solid lines in FIG. 4).

Ball 22 is secured to an adapter plate 42 which is provided with a second ball 44 extending upwardly from the plate 42 for insertion into the downwardly opening complementary socket 46 provided by a housing 47 attached to side rails 48, 50 of a trailer tongue 52. A spring-loaded locking lever 54 retains the second ball 44 in socket 46. Plate 42 is attached, as by removable, inverted U-shaped clamps 51 to housing 47.

A guide plate 56 is attached, as by welding, to upper surfaces of the connector portion 10 to permit ball 22 to be guided upwardly into its socket 24 as a towing vehicle 58 is backed toward the trailer 60 providing socket 46. During such operation, ball 22 contacts guide plate 56. Continued rearward movement of the towing vehicle 58 relative to the trailer 60 causes ball 22 to ride upwardly along the guide plate 56 until the ball 22 reaches the top of connector body portion 10, whereupon ball 22 drops into socket 24.

Connector body portion 10 is provided with a forwardly extending somewhat channel-shaped recess 62 providing suitable clearance for pivoting motion of a load-levelling bar arrangement to be described. A bolt 64 extends through an opening in the bottom center of socket 24 and through the base 66 of connector body portion 10 beneath recess 62. Bolt 64 is retained by a nut 68. Bolt 64 is thereby axially aligned with the pivot axis of the ball 22.

A first circular beveled cam disc 70 is disposed on the upwardly facing surface 72 of base 66. Cam disc 70 is provided with a key 74 which engages in a complementary groove 76 in surface 72 to prevent rotation of cam disc 70. A flat thrust washer 78 is provided between the upper surface 80 of cam disk 70 and the lower surface 82 of a second beveled cam disc 84. The disc 70, 84 and the interposed washer have an axis concentric with the axes of bolt 64 and ball 22. Cam discs 70, 84 are provided with central apertures 86, 88, respectively, which freely rotatably receive bolt 64.

The upper surface 90 of cam disc 84 is formed to provide a narrow, raised, transversely extending portion 92 providing diametrically opposed pins 94.

A load-levelling bar assembly includes a pair of housings 98, including sockets 102, movably engaging pins 94. Housings 98 are further provided with rearwardly opening, circular cross-section sockets 108. Housings 98 have upstanding projections 112 having axially aligned, horizontally extending, circular cross-section passageways 114. An equalizing pin 116 is inserted into the passageways 114 to connect the housings 98 pivotally about the axis of the pin 116. The housings 98 are held downward upon their respective pins 94 by a coil spring 118 disposed about the bolt 64 between the top 120 of recess 62 and the tops of housings 98. A friction shoe housing 117 is pivotally mounted on the equalizing pin 116 between projections 112.

A pair of identical load levelling bars 122 are provided. Each bar 122 has a first end 124 sized for rotatable insertion into a respective socket 108. Ends 124 may be knurled, as illustrated. Bars 122 taper uniformly rearwardly from first ends 124 to their second ends 126.

The connector body portion 10 of the hitch 12 is provided with a downwardly facing first friction surface 128. A second, upwardly-facing anti-sway friction surface is provided by a braking shoe 130, mounted in friction shoe housing 117. Application of vertically upward force on the second ends 126 of bars 122 increases the frictional coupling of the contacting surface 128 and shoe 130 to increase the ability of bars 122 to withstand any side-to-side sway. Side-to-side sway would normally be manifested as swinging movement of housings 98 and their respective bars 122 in a generally horizontal plane about bolt 64.

As best illustrated in FIGS. 1-3, the hitch 12 further includes a pair of supports 134 for the second ends 126 of the bars 122. Each support 134 includes a vertically lower support plate 136 and a vertically upper support plate 138 adjustably joined by four bolts 140 and nuts 142. This configuration permits each support 134 to be slidably mounted on one of the tubular, generally rectangular cross-section side rails 48, 50 of the trailer tongue 52. The supports 134 are adjustable toward or away from the socket 46 end of side rails 48, 50. Their positions along side rails 48, 50 are fixed by tightening the nuts 142 on their respective bolts 140. Each upper support plate 138 includes a generally right circular cylindrical support column 144 which extends through, and is welded into place in, an aperture provided in the support plate 138. A brace 146 is welded between the underside of each plate 138 and the lower end of its respective column 144. A passageway 148 is provided in each of the lower support plates 136 to receive the lower end of its respective column 144 when the plates 136, 138 are clamped together.

Each support column 144 slidably receives a generally vertically extending jacking bolt 150 formed to provide an eye 152 at its vertically lower end. Each bolt 150 is provided with a jacking head 154 at its vertically upper extent. The upper approximately one-half of the length of jacking bolt 150 is provided with a series of diametrically extending circular passageways 156. Each jacking head 154 is provided with a similar passageway 158 (FIG. 1). The jacking heads 154 are positioned on the jacking bolts 150 by aligning the circular passageways 158 of the heads 154 with selected passageways 156 in the bolts 150 and inserting through each pair of aligned passageways a retainer pin 160.

Each retainer pin 160 is provided with a head 162 which pivotally supports a spring clip 164. The end of each spring clip 164 remote from its respective head 162 is formed into a loop 166 engageable over the end of the pin 160 to prevent the pin 160 from sliding out of the passageways 156, 158. In this manner, the jacking heads 154 are attached to bolts 150 in load-bearing relationship.

The upper support plates 138 are sufficiently large that they can support a jacking device, such as a small portable hydraulic jack 168. The jack 168, in the conventional manner, includes a hydraulic cylinder 170 carrying a piston (not shown) to which is attached a piston rod 172. The vertically upper end of the piston rod 172 engages the undersides of the jacking heads 154. Hand manipulation of the jack handle lifts the jacking bolts 150 vertically. The vertical position of each jacking bolt 150 with respect to its support column 144 is fixed by passing a retainer pin 160 through a selected circular passageway 156 in each jacking bolt 150 above the vertically upper end of its respective support column 144.

It will be appreciated that this adjustment arrangement permits loading of the bars 122 through their engagement in the eyes 152 of respective jacking bolts 150. This arrangement is therefore useful to level the trailer tongue 52 side rails 48, 50 with the draw bar 18 and the frame (not shown) of the towing vehicle 58. This arrangement effectively transmits some of the weight of the trailer 60 from the trailer hitch 12 to the wheels (not shown) of the trailer 60 and towing vehicle 58. This arrangement can be utilized to distribute such weight more uniformly. Further, jacking of the second ends 126 of the bars 122 urges the braking shoes 130, 132 into more intimate contact, reducing the tendency of the trailer 60 to sway behind the towing vehicle 58. An optimum adjustment of the load-levelling and anti-sway characteristics of the hitch 12 can be made by moving the supports 134 forwardly or rearwardly on their respective side rails 48, 50, by choosing load-levelling bars 122 having a desired taper, and by raising the ends 126 of the bars 122 to desired vertical heights using the jack 168. These three adjustments can be used to provide highly desirable ride characteristics for various towing vehicle/trailer combinations 58/60.

It must further be noted that the use of circular cross-section bars 122 and sockets 108 in housings 98 permits bars 122 to be rotated from time to time to prevent the bars from taking a set due to applied load.

The invention encompasses load-levelling bars and support means which function as anti-sway devices and are utilized as members for the transmission of stabilizing forces to the interface between two contoured friction plates, thereby producing a positive stabilizing engagement pressure between the towing vehicle and the trailer vehicle in all modes of operation and adding considerable stability between the towing vehicle and the trailer. Positive engagement pressure is maintained at all times between contoured friction plates located on the hitch body. This positive engagement pressure greatly minimizes trailer sway caused by cross winds or large, rapidly passing vehicles. Also during the making of a right or left hand turn, or following road curvature, additional stabilizing forces are transmitted to either the right or left hand side of the contoured friction plates depending on the direction of the turn. This feature provides excellent control of the towing vehicle and the trailer vehicle when making right or left turns at slow or fast speeds. Positive engagement stabilizing pressure is produced by placement of a screw jack, hydraulic jack or other means between each bracket and its respective adjustable jacking bolt. Application of force through the jack moves the trailer tongue upward until the towing vehicle and the trailer are level. Such levelling at the same time transmits stabilizing engagement force through the load-levelling bars resulting in the stabilizing positive engagement pressure at the interface of the contoured friction plates. Subsequent to the levelling of the towing vehicle and trailer, a case hardened locking pin is used to secure each jacking bolt in a fixed position relative to its respective column, resulting in a positive stabilizing engagement between the towing vehicle and the trailer during all modes of operation.

In addition, the support brackets are so designed that they can be located at various horizontal positions on a trailer frame. This feature allows for optimizing the positive engagement stabilizing force transmitted through the load-levelling and the positive engagement stabilizing pressure at the interface of the contoured friction plates.

I claim:

1. A trailer hitch assembly comprising towing means secured to a towing vehicle, connecting means secured to said towing means and adapted for detachably engaging the tongue of a trailer, the trailer tongue including forwardly converging side rails, said connecting means including vertical post means, load-levelling bar means, means for pivotally mounting said load-levelling bar means on said connecting means for swinging movement in a generally horizontal plane about said post means, support means mounted on said trailer tongue, the support means including first means longitudinally movably engaging the side rails of the trailer tongue, second means movably engaging the ends of the bars remote from the housing members and third means for vertically selectively adjusting the second means relative to the first, and fourth means cooperating with the second means for locking the second means in a vertically adjusted position relative to the first, to vary selectively the anti-sway and load-levelling characteristics of the coupling between the trailer and the towing vehicle, and cam means disposed between said load-levelling bar means and connecting means for varying the forces transmitted through said load-levelling bar means upon said swinging movement of said load-levelling bar means about said post means, said load-levelling bar means comprising two housing members disposed adjacent each other and extending rearwardly from said post means, each of said housing members including a rearwardly opening socket, said load-levelling bar means comprising a pair of generally circular cross-section bars and each said socket having a generally circular cross-section to permit rotation of said bars in said sockets.

2. The apparatus of claim 1 wherein each said circular cross-section bar is tapered from a larger diameter adjacent its respective socket to a smaller diameter adjacent its respective second means.

3. A trailer hitch assembly comprising draw bar means attached to a towing vehicle, connecting means attached to said draw bar means and means attached to the forward end of a trailer tongue for selectively coupling the connecting means, the connecting means including vertical post means, load-levelling bar means, means for pivotally mounting said load-levelling bar means on said connecting means for swinging movement in a generally horizontal plane about said post means, support means mounted on said trailer tongue for engaging said load-levelling bar means, and first and second cam discs concentrically disposed about said post means and having complementary beveled engaging surfaces, one of said discs being non-rotatably secured to said connecting means and the other of said discs including means for connecting said load-levelling bar means thereto for simultaneous rotation to vary forces transmitted through said load-levelling bar means upon swinging movement of said load-levelling bar means about said post means, said load-levelling bar means comprising two independent housing members disposed adjacent each other and extending rearwardly from said other of said discs, and a rearwardly opening socket in each of said housing members, said load-levelling bar means comprising first and second generally circular cross-section bars, each tapering from a larger diameter adjacent its respective socket to a smaller diameter adjacent said support means, said sockets having generally circular cross-section to permit rotation of said bars in said sockets, said support means including first means adjustably longitudinally movable along side rails of said trailer tongue, second means movably engaging the ends of the tapered bars adjacent said support means, and third means for vertically selectively adjusting the second means relative to the first means, and fourth means cooperating with the second means for locking the second means on the first means in a vertically adjusted position, the first, second, third, and fourth means cooperating to vary selectively the stiffness of the coupling between the trailer and towing vehicle.

4. A trailer hitch assembly comprising a draw bar for attachment to a towing vehicle, connecting means for selective attachment to the draw bar, means for attachment to the tongue of a trailer to be towed and selectively engageable by said connecting means, said connecting means including a vertical post, two independent housing members disposed adjacent each other and extending rearwardly from said post, each housing member provided with a rearwardly opening socket, first and second cam discs disposed intermediate said post and said housing members, said first and second cam discs being concentrically disposed about the post and having complementary beveled engaging surfaces, said first disc being non-rotatably secured to said connecting means and said second disc including means for connecting said housing members thereto for simultaneous rotation, a pair of load-levelling bars, each having first and second ends, the first end of each bar being disposed in a respective one of said sockets, and support means mounted on the side rails of said trailer tongue, the support means including first means selectively adjustably movably engaging a respective trailer tongue side rail, second means movably engaging the second end of a respective bar, third means for selectively adjusting the second means vertically relative to the first, and fourth means for locking the second means in a vertically adjusted position relative to the first, said first, second, third, and fourth means cooperating to vary selectively the stiffness of the coupling between the trailer and towing vehicle.

5. A trailer hitch assembly comprising a draw bar for attachment to a towing vehicle, connecting means for selective attachment to said draw bar, and means attached to the forward end of the trailer tongue for engaging said connecting means, the trailer tongue including two side rails, said connecting means including a vertical post, first and second cam discs concentrically disposed about the post and having complementary beveled engaging surfaces, one of said discs being nonrotatably secured to said connecting means, two housing members disposed adjacent each other, said second cam disc including means for connecting said housing members thereto for conjoint rotation, each said housing member including means defining a rearwardly opening socket, a first contoured friction member nonrotatably mounted on said connecting means, and a second contoured friction member operatively connected to said housing members and disposed normally in engagement with said first friction member such that force is imparted through said housing members to press said first and second friction members into engagement with one another, two load-levelling bars, each having a first end engaged in a respective one of said sockets, and a second end remote from its respective socket, a load-levelling bar support mounted on each of the two side rails of the trailer tongue, each said support including a first plate adapted to be disposed substantially horizontally above its respective side rail, a second plate adapted to be disposed substantially horizontally beneath its respective side rail, threaded adjustment means for adjustably varying the tension between said first and second plates to clamp a respective side rail therebetween, a hollow tubular support attached to one of said first and second plates and extending perpendicular thereto, a rod sized for slidable insertion through said tubular support and including an eye at its vertically lower end for receiving the second end of a respective load-levelling bar and means providing a head on the rod, a jack adapted to be selectively positioned on one of said plates and engageable with said head to jack said rod vertically with respect to said tubular support, and means for locking the rod in selected vertical adjustment relative to said first and second plates.

6. The apparatus of claim 5 wherein said locking means comprises a locking pin, said rod providing a plurality of vertically spaced transversely extending passageways therein, and said locking pin being sized for insertion in said passageways to prevent vertically downward movement of said rod in said hollow tubular support.

* * * * *